United States Patent
Beer

(10) Patent No.: US 10,710,460 B2
(45) Date of Patent: Jul. 14, 2020

(54) DYNAMIC COMMUNICATION OF ACTUAL CHARGING CAPACITY

(71) Applicant: Bayerische Motoren Werke Aktiengesellschaft, Munich (DE)

(72) Inventor: Michael Beer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 51 days.

(21) Appl. No.: 16/059,161

(22) Filed: Aug. 9, 2018

(65) Prior Publication Data

US 2018/0345800 A1 Dec. 6, 2018

Related U.S. Application Data

(63) Continuation of application No. PCT/EP2017/051222, filed on Jan. 20, 2017.

(30) Foreign Application Priority Data

Feb. 10, 2016 (DE) ........................ 10 2016 202 002

(51) Int. Cl.
*B60L 53/64* (2019.01)
*B60L 11/18* (2006.01)
(Continued)

(52) U.S. Cl.
CPC ............. *B60L 11/184* (2013.01); *B60L 53/14* (2019.02); *B60L 53/30* (2019.02); *B60L 53/60* (2019.02);
(Continued)

(58) Field of Classification Search
CPC ....... H02J 7/0004; B60L 11/184; B60L 53/64; B60L 53/68
(Continued)

(56) References Cited

U.S. PATENT DOCUMENTS

2009/0039837 A1 2/2009 Suzuki
2012/0091953 A1 4/2012 Paryani et al.
(Continued)

FOREIGN PATENT DOCUMENTS

DE 10 2010 054 472 A1 6/2012
DE 10 2013 008 716 A1 11/2014
(Continued)

OTHER PUBLICATIONS

International Search Report (PCT/ISA/210) issued in PCT Application No. PCT/EP2017/051222 dated Mar. 29, 2017 with English translation (six (6) pages).
(Continued)

*Primary Examiner* — Edward Tso
*Assistant Examiner* — Aaron Piggush
(74) *Attorney, Agent, or Firm* — Crowell & Moring LLP

(57) ABSTRACT

An energy management device for controlling a charging control appliance in an electric vehicle is provided. The energy management device is designed to adjust a charging profile in the charging control appliance for the charging of a battery of the electric vehicle on a charging station or in the electric vehicle itself, the adjustment of the charging profile at least taking into account a planned time of use of the electric vehicle and a desired charging state of the battery as well as a pre-defined value for the maximum charging capacity of the electric vehicle. The energy management device is coupled to a measuring unit which is designed to measure an actual charging capacity provided for the electric vehicle by the charging station and, independently or as a result of a request from the energy management device, transmit same to the energy management device. The energy management device is designed to use the value of the actual charging capacity for a corresponding new adjustment of the charging profile.

15 Claims, 2 Drawing Sheets

(51) Int. Cl.
*H02J 7/00* (2006.01)
*B60L 53/30* (2019.01)
*B60L 53/60* (2019.01)
*B60L 53/14* (2019.01)
*B60L 58/12* (2019.01)
*B60L 53/68* (2019.01)
*H01M 10/42* (2006.01)
*H01M 10/48* (2006.01)

(52) U.S. Cl.
CPC ............... *B60L 53/64* (2019.02); *B60L 53/68* (2019.02); *B60L 58/12* (2019.02); *H01M 10/425* (2013.01); *H01M 10/48* (2013.01); *H02J 7/0021* (2013.01); *H02J 7/00036* (2020.01); *H02J 7/0047* (2013.01); *B60L 2240/70* (2013.01); *B60L 2250/12* (2013.01); *B60L 2250/14* (2013.01); *H01M 10/4257* (2013.01); *H01M 2010/4271* (2013.01); *Y02T 10/705* (2013.01); *Y02T 10/7011* (2013.01); *Y02T 10/7044* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y04S 30/12* (2013.01)

(58) Field of Classification Search
USPC .................................. 320/104, 109, 132, 155
See application file for complete search history.

(56) References Cited

U.S. PATENT DOCUMENTS

2013/0278225 A1* 10/2013 Dietze et al. ....... B60L 11/1838
320/137
2013/0307475 A1* 11/2013 Kishiyama et al. .... H02J 7/007
320/109
2014/0055082 A1   2/2014 Kun et al.

FOREIGN PATENT DOCUMENTS

| DE | 10 2013 211 265 A1 | 12/2014 |
| EP | 2 902 250 A2 | 8/2015 |
| WO | WO 2012/095129 A2 | 7/2012 |
| WO | WO 2013/019989 A2 | 2/2013 |

OTHER PUBLICATIONS

German-language Written Opinion (PCT/ISA/237) issued in PCT Application No. PCT/EP2017/051222 dated Mar. 29, 2017 (six (6) pages).

German-language Search Report issued in counterpart German Application No. 102016202002.1 dated May 12, 2016 with partial English translation (eleven (11) pages).

* cited by examiner

DYNAMIC COMMUNICATION OF ACTUAL CHARGING CAPACITY

CROSS REFERENCE TO RELATED APPLICATIONS

This application is a continuation of PCT International Application No. PCT/EP2017/051222, filed Jan. 20, 2017, which claims priority under 35 U.S.C. § 119 from German Patent Application No. 10 2016 202 002.1, filed Feb. 10, 2016, the entire disclosures of which are herein expressly incorporated by reference.

BACKGROUND AND SUMMARY OF THE INVENTION

The invention relates in general to the field of electric mobility. In particular, the invention relates to charging communication between a charging station and a charging control appliance of an e-vehicle in accordance with ISO/IEC 15118.

Background to the Invention

Charging stations are used for charging a battery, usually a rechargeable lithium-ion battery, of an electric vehicle (e-vehicle). The standard for so-called intelligent charging (smart charging), ISO/IEC 15118, now defines the charging communication between the charging station and a charging control appliance of the e-vehicle, in order to actively control the charging process in that, for example, the current consumption is spontaneously changed during the charging process in order to avoid overloading the electricity network. As far as the communication is concerned, ISO 15118 employs Power Line Communication (PLC) and a TCP/IP protocol stack with the IP and TCP protocols, or alternatively with the User Datagram Protocol (UDP). In the application layer, the Domain Name System (DNS) for compiling names, the Transport Layer Security (TLS) for the encryption of the data on the transport layer, the Vehicle to Grid Transport Protocol (V2GTP) and a module for the smart charging are placed on the protocol stack.

After the charging cable has been inserted, the charging control appliance of the e-vehicle first establishes a communication link to the charging station through PLC. The vehicle then receives an IP address by DHCP, whereupon the charging control appliance queries what IP address the charging station has through a broadcast (Charge Point Discovery). The vehicle now establishes a TCP link and a TLS link on top of that, while both the charging station and the e-vehicle authenticate themselves using certificates. Service information, tariff tables and charging profiles are exchanged and selected via this encrypted link, while the payment modalities are also resolved. The cable is now physically locked, so that it cannot be withdrawn during the charging process—in part in order to prevent electricity theft. Finally the charging station switches on the current, and the real charging starts. The e-vehicle and the charging station here regularly exchange their status and their power meter readings, and the e-vehicle acknowledges the purchase of the energy. During the charging, the e-vehicle can put itself into an idle state in order to reduce its own energy consumption. It wakes up periodically from this idle state in order to carry out a status update. The charging itself is continued unbroken at this time. At the end, the charging station switches current off and releases the connector lock. The last acknowledged meter reading is conveyed over the Internet to the energy supplier for billing.

According to ISO/IEC 15118, the charging control appliance of the e-vehicle should communicate or transmit a maximum possible power consumption (Pmax) of the e-vehicle to an energy management system (EMS) for energy management functions. The EMS plans an optimum charging operation on the basis of this transmitted maximum possible power consumption Pmax.

Disclosure of the Invention

The inventor has established that in practice the communicated or transmitted maximum possible power consumption Pmax is often not reached for a variety of reasons during the charging procedure. This means that the actually achievable charging power Pmax-act of the e-vehicle differs from the transmitted theoretical maximum power Pmax. This has a direct effect on the quality of prognosis and the optimization of the EMS.

It is an object of the present invention to provide a charging control appliance in which the actual charging power is improved. A vehicle with a corresponding charging control appliance is also provided. In addition, a method for charging control is provided.

The object is achieved with the respective features of the independent claims. Further exemplary embodiments and advantageous developments result from the respective dependent claims, the description and the drawings. Features and details that are described in connection with the charging control appliance are, of course, also applicable in association with the corresponding methods for charging control, and conversely in each case.

A central idea of the invention is that of determining differences between the actually achievable charging power Pmax-act of the e-vehicle and the transmitted, theoretical maximum power Pmax by means of online measurements, and configuring the transmitted maximum power value Pmax dynamically to the actual power consumption Pmax-act. The quality of prognosis and the optimization by the EMS can be improved in this way. In addition, a reconfiguration on the part of the charging control appliance or of the EMS as a result of the difference between the theoretical energy consumption and the actual energy consumption can be avoided.

A first aspect of the invention relates to an energy management device for configuring a charging profile at a charging control appliance in an electric-vehicle. For this purpose the energy management device is designed to configure the charging profile at or in the charging control appliance for the charging of a battery of the electric vehicle at a charging station.

A charging profile is the curve against time of the charging power of a battery or a battery system, particularly in an electric vehicle. The charging profile can result from an external specification if, for example, an optimization of the energy withdrawal is set as a target. It can, however, also be a property of the battery system, e.g., because the charging power falls as the final charging voltage is reached. The latter can be one reason amongst others why the predetermined charging power is not achievable.

The charging profile is configured at least taking into account a planned time of use of the electric vehicle and a desired charge state (state of charge, SoC) of the battery, as well as a predetermined value for the maximum receivable charging power Pmax of the electric vehicle.

The energy management device is coupled, according to the invention, to a measuring unit which is designed to measure an actual charging power delivered to the electric vehicle by the charging station and, independently or as a result of a request from the energy management device, to transmit it to the energy management device.

The energy management device is furthermore designed to use the value of the actually delivered charging power Pmax-act for a corresponding reconfiguration of the charging profile.

The energy management device can be integrated into the electric vehicle, preferably into the charging control appliance. Alternatively, the energy management device can be implemented through programming on a backend server, for example, of the vehicle manufacturer or of an energy supplier. The charging control appliance can be connected communicatively to the backend server by means of a data transmission device of the electric vehicle or also via a PLC data connection to the charging station, preferably over the Internet. The measuring unit can be integrated into the charging control appliance and/or into the charging station.

According to a second aspect of the invention, the energy management device can also be integrated into the charging station. The measuring unit can, equally, be integrated into the charging control appliance and/or into the charging station.

A third aspect of the invention relates to a method for configuring a charging profile in a charging control appliance for charging a battery of an electric vehicle at a charging station. The charging profile is configured in an energy management device, preferably taking into account a planned time of use and a desired charge state of the battery, as well as a predetermined value for the maximum receivable charging power of the electric vehicle. The method includes the following steps:

measuring the actual charging power (Pmax-act) delivered by the charging station to the electric vehicle, transmitting the actual charging power (Pmax-act) to the energy management device, and configuring the charging profile on the basis of the measured actual charging power (Pmax-act).

Preferably the method is carried out at regular time intervals. This can, for example, take place every 15 minutes under the control of a corresponding timer. Other time intervals, or irregular time intervals, are, of course, also possible.

Preferably the transmission step is only carried out if the value has changed, preferably by a predetermined amount, with respect to the most recently transmitted value.

A fourth aspect of the invention relates to an electric vehicle with a battery and a charging control appliance for the battery. The electric vehicle further comprises an energy management device in accordance with the first aspect of the invention, or is connected to it communicatively over a data connection.

A fifth aspect of the invention relates to a charging station for charging a battery of an electric vehicle comprising an energy management device in accordance with the second aspect of the invention.

Preferred Exemplary Embodiments

Further advantages, features and details of the invention emerge from the following description in which an exemplary embodiment of the invention is described in detail with reference to the drawings. The features explained in the claims and in the description can here each individually, on their own or in any combination, be relevant to the invention. Similarly, the features listed above and explained further here can each be used alone or as a plurality in any combinations. Parts or components which have similar functions or are identical are given the same reference signs. The exemplary embodiment shown and described is not to be understood as restrictive, but has an exemplary character for explanation of the invention. The description serves for the information of the expert, for which reason known structures and methods in the description are not shown or explained in detail, in order to not make understanding more difficult.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
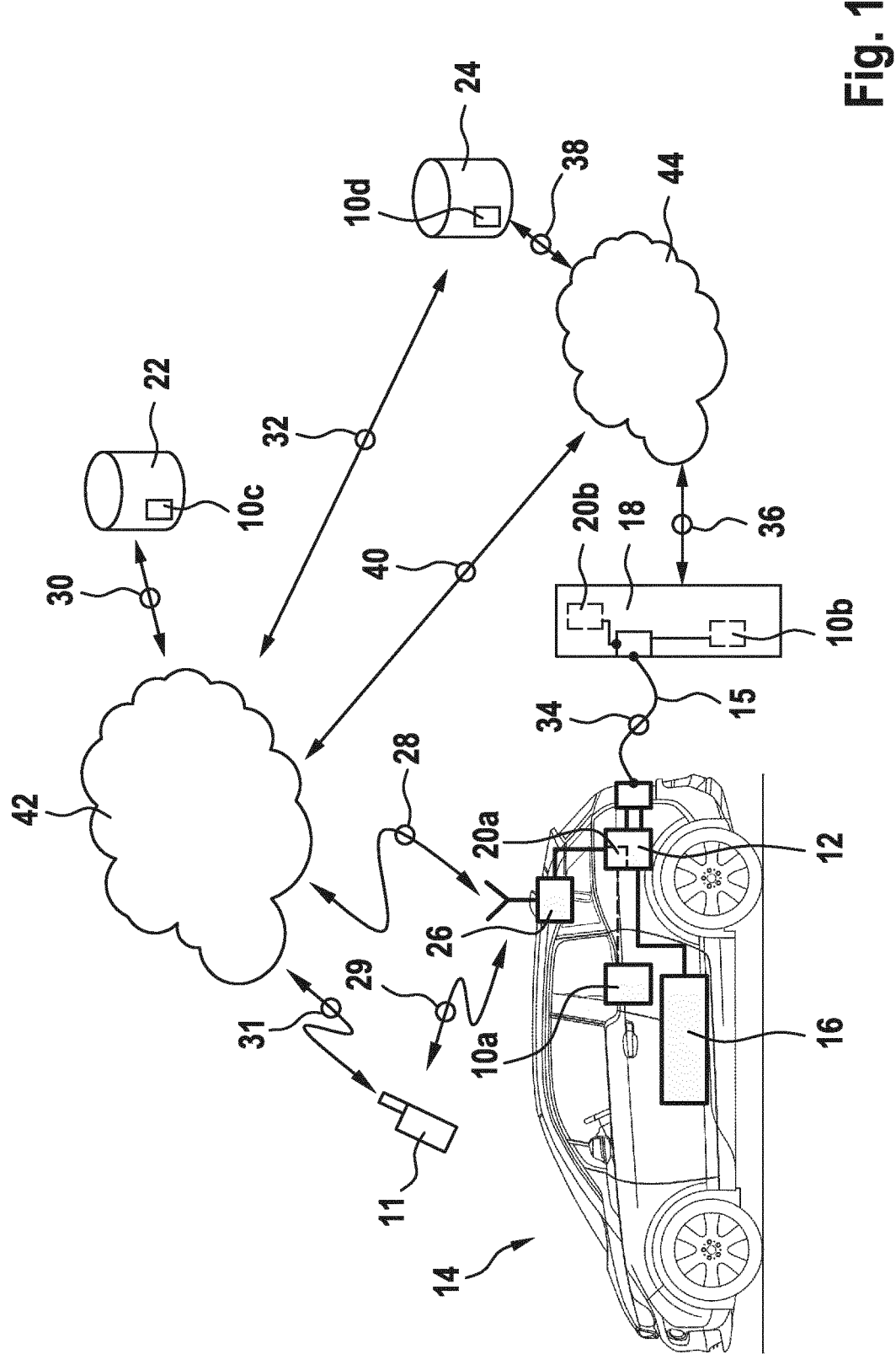
FIG. 1 illustrates an electric vehicle which is connected via a charging cable to a charging station for charging a battery of the electric vehicle, where the charging process is controlled by a charging control appliance in accordance with a charging profile configured by an energy management device.

FIG. 1 shows an electric vehicle 14 which is connected via a charging cable 15 to a charging station 18 for charging a battery 16 of the electric vehicle 14. The charging process of the battery 16 is controlled by a charging control appliance 12 of the electric vehicle 14 in accordance with a charging profile configured by an energy management device 10a, 10b, 10c or 10d.

A user of the electric vehicle 14 can, for example, make settings at an energy management device 10a, 10b, 10c or 10d at a driver information system (not shown) of the vehicle or at a software application (app) running as a graphic user interface on a mobile small computer, for example, a smartphone 11 or a tablet computer. These settings can, for example, contain future times of use of the electric vehicle 14 as well as a desired charge state (SoC) of the battery 16 for the usage.

The energy management device 10a, 10b, 10c or 10d is designed, amongst other things, to configure an optimum charging profile at the charging control appliance 12 for charging the battery 16 of the electric vehicle 14 at the charging station 18. The energy management device 10a, 10b, 10c or 10d here takes at least the next planned time of use of the electric vehicle 14 and, if relevant, the charge state of the battery 16 desired for that purpose into account. The energy management device 10a, 10b, 10c or 10d can, furthermore, also refer to electricity tariffs and the associated time plans and/or the availability of alternative energy sources such as wind or solar electricity sources for cost-saving purposes when configuring the charging profile. This means that if sufficient time is available before the next time of use, the energy management device 10a, 10b, 10c or 10d will attempt to configure the charging profile such that the battery 16 can be charged as economically as possible up to the desired charge state.

The maximum charging power Pmax receivable by the electric vehicle 14 when charging is an important parameter, amongst others, for planning the charging profile. This value is usually stored in the charging control appliance 12 by the vehicle manufacturer according to the technical properties at the vehicle. During a charging process, the electric vehicle then draws this charging power in order to charge the battery. It has, however, been established that for a wide range of reasons, it happens that this maximum charging power Pmax is not made available or cannot be made available by the charging station 18 to the electric vehicle 12. As a result, the charging process is correspondingly lengthened. This has a corresponding effect on the quality of prognosis for the charging process on the part of the energy management device 10a, 10b, 10c or 10d. In other words, the charging profile is incorrectly configured due to a difference between the charging power that is actually possible and the theoretical maximum charging power.

In order to rectify this problem, the energy management device 10a, 10b, 10c or 10d is coupled to a measuring unit 20a or 20b. The measuring unit 20a or 20b is configured to measure the actual charging power Pmax-act delivered to the electric vehicle 14 by the charging station 18.

The measuring unit 20a or 20b is further configured to transmit the current value of the actual charging power Pmax-act delivered, independently or as a result of a request from the energy management device 10a, 10b, 10c or 10d, to the energy management device 10a, 10b, 10c or 10d.

As a result, the current value of the actual charging power Pmax-act delivered is known to the energy management device 10a, 10b, 10c or 10d. The energy management device 10a, 10b, 10c or 10d can accordingly then use this value of the actual charging power (Pmax-act) for a corresponding reconfiguration or recalculation of the charging profile. The quality of prognosis and the optimization by the energy management device are thus more accurate, and a reconfiguration on the part of the charging control appliance or of the energy management device as a result of the difference between the theoretical energy consumption and the actual energy consumption of the battery 16 during the charging process can be avoided.

A plurality of possibilities are shown in FIG. 1 for the place at which the energy management device 10a, 10b, 10c or 10d can be implemented. In one version, the energy management device 10a is integrated into the electric vehicle 14, for example, into the driver information system (not shown in FIG. 1). An energy management device 10b can alternatively be integrated into the charging control appliance 12.

Additionally or alternatively, an energy management device 10c or 10d can be implemented through programming in a backend server 22 or 24. The charging control appliance 12 can be connected to the Internet 42 by a data transmission device 26, for example, a radio interface for mobile data transmission of the electric vehicle 14.

The charging control appliance 12 can also be connected via a data connection 29 by a transmission device 26, for example, a short-range radio interface such as WLAN, Bluetooth, ZigBee or the like of the electric vehicle 14, to the smartphone 11 on which the above-mentioned software application is running as a graphic user interface to the energy management device. The smartphone 11 is itself connected via a data connection 31 to the Internet 42.

The energy management device 10b can finally also be integrated into the charging station 18. The charging control appliance 12 is then connected communicatively to the energy management device 10b via the PLC connection integrated into the charging cable 15. The charging station 18 can be connected to the Internet 42, and thereby to one of the backend servers 22, 24, through its connection to a power supply network 44 which, in the known manner, makes a connection to the Internet 42 available.

The measuring unit 20a is integrated into the charging control appliance 12. Alternatively, the measuring unit 20b is integrated into the charging station 18. Both possibilities are equally good for the solution proposed here for dynamic communication of the charging power Pmax-act that is actually delivered.

The backend server 22 illustrated in FIG. 1, in which the energy management device 10c can be implemented, is a server of the vehicle manufacturer. If the energy management device 10c is located at the vehicle manufacturer, technical improvements can be implemented immediately to the advantage of the user. In addition, the vehicle manufacturer in this way always obtains up-to-date data such as, for example, the state of the batteries 16, etc., about the electric vehicles that are in use.

The backend server 24 illustrated in FIG. 1, in which the energy management device 10d can be implemented, is a server of one or more energy suppliers. If the energy management device 10d is located at the energy supplier, information about the electricity tariffs can be taken into account immediately in the planning of the charging profile. In addition, the energy supplier obtains in this way an up-to-date status overview of the electric vehicles 14 connected to his charging stations 18, and by merging the many charging profiles has a possibility of being better able to plan the power requirement for the electric mobility.

Essentially, it is possible to use the various configuration options illustrated in FIG. 1 for carrying out a method for configuring a charging profile in the charging control appliance 12 for charging the battery 16 of the electric vehicle 14 at the charging station 18.

Figure 2:
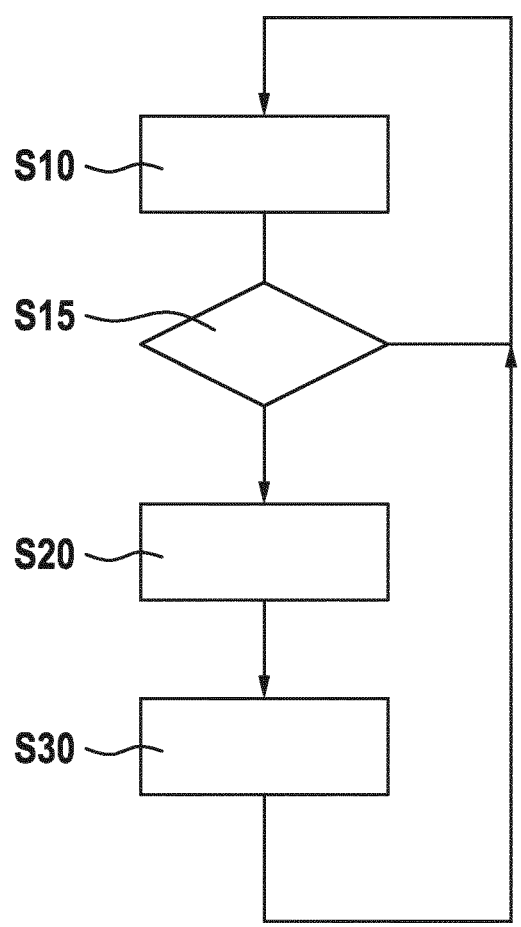
FIG. 2 shows a flow diagram for a method for configuring a charging profile in a charging control appliance for charging a battery of an electric vehicle at a charging station.

FIG. 2 shows a simplified flow diagram for the method.

As already explained, the charging profile is configured by one of the energy management devices 10a, 10b, 10c or 10d, taking into account a planned time of use and a desired charge state of the battery 16, as well as a predetermined value for the maximum receivable charging power of the electric vehicle 14.

The method comprises a step S10 in which the actual charging power Pmax-act being delivered to the electric vehicle 14 by the charging station 18 is measured.

The value of the measured, actually delivered charging power Pmax-act is transmitted in a step S20 to one of the energy management devices 10a, 10b, 10c or 10d.

In a step S30, the charging profile is then configured on the basis of the measured, actual charging power Pmax-act by the energy management device 10a, 10b, 10c or 10d.

The method can be repeated automatically at regular time intervals. Alternatively or in addition, it can be provided in the method that the transmission step S20 is only carried out when the value of the measured, actual charging power Pmax-act has changed with respect to the most recently transmitted value, preferably by a predetermined amount. A corresponding step S15 in which this is checked is shown in FIG. 2. If the value has not changed enough, i.e., has remained essentially unchanged, the method returns immediately to step S10. If the value has changed enough, the method continues to step S20.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy management device for configuring a charging profile at a charging control appliance for charging a battery of an electric vehicle at a charging station, wherein the charging profile is configured by taking into account a planned time of use of the electric vehicle, a desired charge state of the battery, and a predefined value for a maximum receivable charging power of the electric vehicle, wherein the energy management device is further coupled to a measuring unit which is designed to measure an actual charging power delivered to the electric vehicle by the charging station and, independently or as a result of a request from the energy management device, to transmit the actual charging power to the energy management device, and wherein the energy management device is designed to use a value of the actual charging power for a corresponding reconfiguration of the charging profile;

wherein transmitting of the actual charging power to the energy management device is only carried out if a value of the actual charging power has changed by a predetermined amount with respect to a most recently transmitted value.

2. The energy management device as claimed in claim 1, wherein the energy management device is integrated into the charging control appliance of the electric vehicle.

3. The energy management device as claimed in claim 1, wherein the energy management device is implemented through programming on a backend server, with which the charging control appliance is communicatively connected over the Internet by a data transmission device of the electric vehicle or by the charging station.

4. The energy management device as claimed in claim 3, wherein the measuring unit is integrated into at least one of the charging control appliance and the charging station.

5. The energy management device as claimed in claim 1, wherein the measuring unit is integrated into at least one of the charging control appliance and the charging station.

6. The energy management device as claimed in claim 1, wherein the energy management device is integrated into the charging station.

7. The energy management device as claimed in claim 6, wherein the measuring unit is integrated into the charging control appliance and the charging station.

8. A charging station for charging a battery of an electric vehicle comprising an energy management device as claimed in claim 6.

9. The charging station as claimed in claim 8, wherein the measuring unit is integrated into the charging control appliance and the charging station.

10. A method for configuring a charging profile in a charging control appliance for charging a battery of an electric vehicle at a charging station, wherein the charging profile is configured taking into account a planned time of use of the battery, a desired charge state of the battery, and a predefined value for the maximum receivable charging power of the electric vehicle in an energy management device, the method comprising:

measuring an actual charging power delivered by the charging station to the electric vehicle, transmitting the actual charging power to the energy management device, and configuring the charging profile based on the measured actual charging power;

wherein the transmitting of the actual charging power to the energy management device is only carried out if a value of the actual charging power has changed by a predetermined amount with respect to a most recently transmitted value.

11. The method as claimed in claim 10, wherein the method is carried out at regular time intervals.

12. An electric vehicle with a battery and a charging control appliance for the battery, wherein the electric vehicle comprises an energy management device for configuring a charging profile at the charging control appliance for charging the battery at a charging station, wherein the charging profile is configured by taking into account a planned time of use of the electric vehicle, a desired charge state of the battery, and a predefined value for a maximum receivable charging power of the electric vehicle, wherein the energy management device is further coupled to a measuring unit which is designed to measure an actual charging power delivered to the electric vehicle by the charging station and, independently or as a result of a request from the energy management device, to transmit the actual charging power to the energy management device, and wherein the energy management device is designed to use a value of the actual charging power for a corresponding reconfiguration of the charging profile;

wherein transmitting of the actual charging power to the energy management device is only carried out if a value of the actual charging power has changed by a predetermined amount with respect to a most recently transmitted value.

13. The electric vehicle as claimed in claim 12, wherein the energy management device is integrated into the charging control appliance of the electric vehicle.

14. The electric vehicle as claimed in claim 12, wherein the energy management device is implemented through programming on a backend server, with which the charging control appliance is communicatively connected over the Internet by a data transmission device of the electric vehicle or by the charging station.

15. The electric vehicle as claimed in claim 12, wherein the measuring unit is integrated into at least one of the charging control appliance and the charging station.

* * * * *